Patented Nov. 24, 1931

1,833,269

UNITED STATES PATENT OFFICE

RICHARD STÜSSER, OF COLOGNE-DEUTZ, GERMANY, ASSIGNOR TO GENERAL ANILINE WORKS, INC., OF NEW YORK, N. Y., A CORPORATION OF DELAWARE

NEW AZO DYE

No Drawing. Application filed January 25, 1928, Serial No. 249,496, and in Germany January 26, 1927.

The present invention relates to new azo dyestuffs and to a process of making the same, more particularly it relates to azo dyestuffs of the probable general formula:

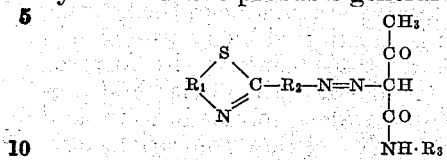

wherein $R_1$, $R_2$ and $R_3$ represent benzene nuclei, $R_3$ and one of $R_1$ and $R_2$ being substituted by a sulfonic acid group and which benzene nuclei may be further substituted by any substituent, e. g. alkyl, halogen, alkoxy, excepted a sulfonic acid group. The new dyestuffs are obtainable by coupling a diazotized aminophenyl - benzothiazole-monosulfonic acid with a sulfonic acid of an acetoacetanilide, or by sulfonating a monoazo dyestuff obtained from a diazotized mono-sulfonated or unsulfonated aminophenyl-benzothiazole and an acetoacetanilide. For the purpose of my invention the two methods of preparing the new dyestuffs are equivalents.

In accordance with the present invention, cotton dyestuffs of good fastness to water and light and a great affinity to the fibre are produced. These dyestuffs can also be employed as pigment dyestuffs. In the form of their alkali-metal salts they are, when dried and pulverized generally yellow to orange powders, soluble in water with a yellow coloration, in sulfuric acid with a yellow to orange coloration. They yield, upon reduction with stannous chloride and hydrochloric acid, an aminophenyl-benzothiazole-monosulfonic acid, α-amino-acetoacetic acid and an aminobenzene-mono-sulfonic acid.

The following examples will illustrate my invention:

Example 1.—342 parts by weight of the sodium salt of dehydrothio-toluidine-ortho-mono-sulfonic acid (prepared according to the baking process from dehydrothio-toluidine sulfate by heating the same) are diazotized in the known manner with 69 parts by weight of sodium nitrite and 300 parts by weight of hydrochloric acid of 19.5° Bé. The diazo compound which separates is filtered and then introduced into a solution of 287 parts by weight of acetoacet-ortho-anisidide sulfonic acid and 250 parts by weight of sodium carbonate at about 10° C. When the coupling is completed, the solution is heated to 60° C. and salted out, whereupon the dyestuff having in its free state the following formula:

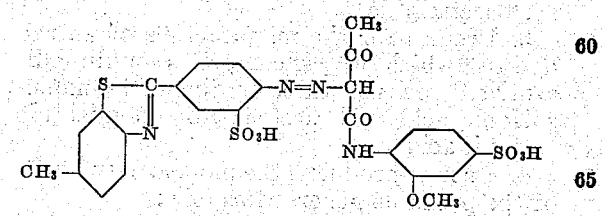

is filtered and dried. It forms a yellow powder, which dyes cotton greenish yellow shades. The dyeing produced is very fast to light and water. The dyestuff also dyes viscose with the production of bright greenish yellow shades. This dyeing is likewise fast to water. The dyestuff can also be precipitated in the form of a pigment dye following the customary methods.

Example 2.—564,4 parts by weight of the dyestuff obtained from dehydrothio-toluidine-monosulfonic acid and acetoacet-orthochloranilide are dissolved in 5000 parts by weight of sulfuric acid monohydrate while cooled in ice. 500 parts by weight of oleum containing 65% of anhydride are then added, and the sulfonating mixture is heated to 45 to 50° C. until the dyestuff has become easily soluble. On completion of the sulfonation, the whole is allowed to cool, poured on to ice, and the precipitated dyestuff of the formula:

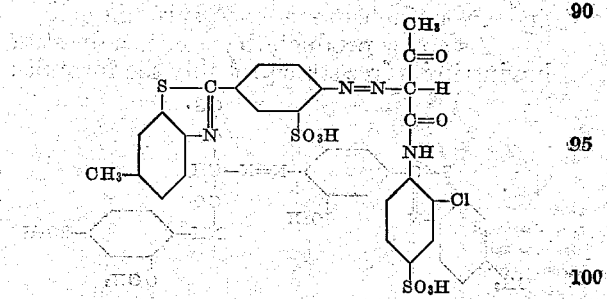

is filtered off; it is then washed free from sulfuric acid with water and redissolved in hot water with sodium carbonate, filtered and salted out from its solution. The dyestuff forms a yellow powder, which dyes cotton yellow shades of satisfactory fastness properties.

The same dyestuff can be obtained by sulfonating the azo dyestuff obtainable by coupling diazotized dehydro-thio-toluidine with aceto-acet-ortho-chloranilide.

The sulfonation can also be carried out by other known processes.

I claim:

1. Process for the manufacture of azo dyestuffs which process comprises coupling a diazotized aminophenyl-benzothiazole-monosulfonic acid with a mono-sulfonic acid of an acetoacetanilide.

2. Process for the manufacture of azo dyestuffs which process comprises coupling diazotized dehydrothiotoluidine-ortho-monosulfonic acid with a mono-sulfonic acid of an acetoacetanilide.

3. Process for the manufacture of an azo dyestuff which process comprises coupling diazotized dehydrothiotoluidine-ortho-monosulfonic acid with acetoacet-ortho-anisidide sulfonic acid.

4. As new products, the monoazo dyestuffs of the probable general formula:

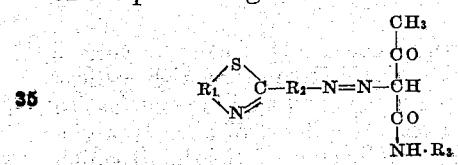

wherein $R_1$, $R_2$ and $R_3$ represent benzene nuclei, of which $R_3$ and one of $R_1$ and $R_2$ are substituted by a sulfonic acid group and all of which may be further substituted by substituents of the group consisting of alkyl, alkoxy and halogen, said dyestuffs being in the form of their alkali metal salts, when dried and pulverized, generally yellow to orange powders, soluble in water with a yellow coloration, in sulfuric acid with a yellow to orange coloration, dyeing cotton yellow to orange shades of good fastness to light and water, being suitable for the employment as pigment dyestuffs and yielding, upon reduction with stannous chloride and hydrochloric acid, an aminophenyl-benzothiazole-monosulfonic acid, α-amino-aceto-acetic acid and an aminobenzene-mono-sulfonic acid.

5. As a new product, the monoazo dyestuff having in its free state probably the formula:

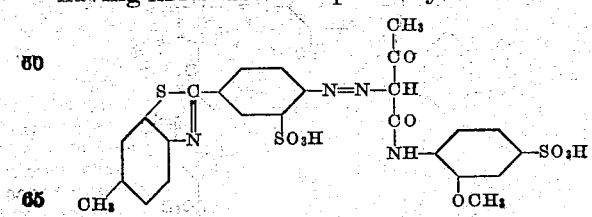

being in the form of its alkali metal salt, when dried and pulverized, a yellow powder, soluble in water and sulfuric acid with a yellow coloration, dyeing cotton greenish yellow shades and yielding, upon reduction with stannous chloride and hydrochloric acid dehydrothio-toluidine-ortho-mono-sulfonic acid, α-amino-aceto-acetic acid and 1-amino-2-methoxy-benzene-4-sulfonic acid.

6. As new products, the monoazo dyestuffs of the general formula:

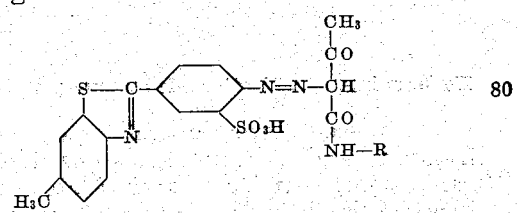

wherein R stands for a residue of the benzene series which is substituted by a sulfonic acid group, said dyestuffs being in the form of their alkali metal salts, when dried and pulverized, yellow powders, soluble in water and sulfuric acid with a yellow coloration, dyeing cotton yellow shades, and yielding, upon reduction with stannous chloride and hydrochloric acid, dehydro-thio-toluidine-ortho-monosulfonic acid, α-amino-acetoacetic acid and an amino-sulfonic acid of the benzene series.

7. As a new product, the monoazo dyestuff having in its free state the following probable formula:

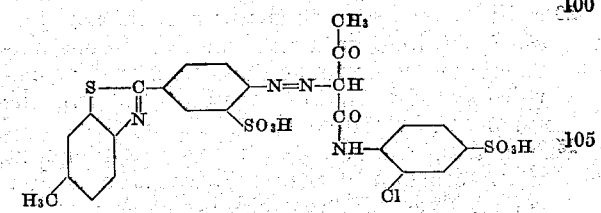

being in the form of its alkali metal salt, when dried and pulverized, a yellow powder, soluble in water and sulfuric acid with a yellow coloration, dyeing cotton yellow shades and yielding, upon reduction with stannous chloride and hydrochloric acid, dehydrothiotoluidine-ortho-monosulfonic acid, α-amino-acetoacetic acid and 1-amino-2-chloro-benzene-4-sulfonic acid.

In testimony whereof I have hereunto set my hand.

RICHARD STÜSSER.